(12) United States Patent
Iwase (10) Patent No.: US 6,648,090 B2
(45) Date of Patent: Nov. 18, 2003

(54) STRUCTURE FOR INSTALLING AN AUTOMOTIVE BATTERY

(75) Inventor: Tsutomu Iwase, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/161,015

(22) Filed: May 30, 2002

(65) Prior Publication Data

US 2002/0157886 A1 Oct. 31, 2002

Related U.S. Application Data

(63) Continuation of application No. 09/667,276, filed on Sep. 22, 2000, now Pat. No. 6,431,300.

(30) Foreign Application Priority Data

Sep. 29, 1999 (JP) .............................................. 11-277151

(51) Int. Cl.[7] .............................................. B60R 16/04
(52) U.S. Cl. ...................................... 180/68.5; 429/100
(58) Field of Search ............................... 180/68.5, 65.1, 180/65.2, 65.3, 65.4, 65.6, 65.7, 65.8; 429/96, 98, 99, 100, 120; 248/500, 503

(56) References Cited

U.S. PATENT DOCUMENTS

| | | | | |
|---|---|---|---|---|
| 3,651,883 A | * | 3/1972 | Aldag | 180/68.5 |
| 3,708,028 A | * | 1/1973 | Hafer | 180/68.5 |
| 4,042,055 A | | 8/1977 | Ward | |
| 4,317,497 A | * | 3/1982 | Alt et al. | 180/68.5 |
| 4,475,611 A | * | 10/1984 | Fisher | 180/65.1 X |
| 4,682,751 A | * | 7/1987 | Tamas | 180/68.5 X |
| 5,238,082 A | * | 8/1993 | Stegeman et al. | |
| 5,392,873 A | * | 2/1995 | Masuyama et al. | 180/68.5 |
| 5,647,450 A | * | 7/1997 | Ogawa et al. | 180/68.5 X |
| 5,934,397 A | | 8/1999 | Schaper | |
| 5,983,612 A | * | 11/1999 | Bauswell et al. | 180/68.5 X |
| 6,230,834 B1 | * | 5/2001 | VanHout et al. | 180/68.5 |
| 6,431,300 B1 | * | 8/2002 | Iwase | 180/68.5 |

FOREIGN PATENT DOCUMENTS

| | | | |
|---|---|---|---|
| EP | 0705724 | | 4/1996 |
| JP | 57-151450 | * | 9/1982 |
| JP | 633058 | | 1/1988 |
| JP | 5-185886 | * | 7/1993 |
| JP | 6-107090 | * | 4/1994 |
| JP | 6-197407 | * | 7/1994 |

OTHER PUBLICATIONS

Patent Abstract of Japan, vol. 017, No. 639, Nov. 26, 1993, & JP 05 201356 A (Honda Motor Co Ltd), Aug. 10, 1993.

* cited by examiner

Primary Examiner—Brian L. Johnson
Assistant Examiner—Bryan Fischmann
(74) Attorney, Agent, or Firm—Martin A. Farber (57) ABSTRACT

A structure for installing an automotive battery which would protect the battery installed in a rear part of a vehicle body is provided. In a structure for installing an automotive battery in which the battery is mounted on a battery mounting base provided on a floor in a rear part of a vehicle body, a rear suspension cross member extends along the direction of vehicle width beneath the floor, and the battery mounting base is located within an area of the floor, the area being a zone of width L in the longitudinal direction of the vehicle body corresponding to the location of the rear suspension cross member in plan view.

4 Claims, 10 Drawing Sheets

STRUCTURE FOR INSTALLING AN AUTOMOTIVE BATTERY

This application is a continuation of my application Ser. No. 09/667,276 filed Sep. 22, 2000, which has issued into U.S. Pat. No. 6,431,300 on Aug. 13, 2002. THE ENTIRE DISCLOSURE OF WHICH IS CONSIDERED AS BEING PART OF THE DISCLOSURE OF THIS CONTINUATION APPLICATION AND IS HEREBY INCORPORATED BY REFERENCE HEREIN IN ITS ENTIRETY.

BACKGROUND OF THE INVENTION

1. Field of the Invention

The present invention relates to a structure for mounting an automotive battery and, more particularly, to a structure for mounting an automotive battery in a rear part of a vehicle body.

2. Description of the Related Art

In an automobile such as a compact car, a space in an engine room formed at a front part of a vehicle is usually small. Therefore, in the case of storing a gasoline engine, an electric motor, and accessories of the both in the engine room in order to form such a small car into a hybrid car, a battery as an automotive power source, which is generally disposed in the engine room, is removed to a rear part of the vehicle such as a trunk room thereof. Thereby, a larger space is made in the engine room, so that the degree of freedom for a vehicle design can be increased.

Similarly, even in an electric car based on a conventional vehicle with a gasoline engine mounted thereon, it is convenient to dispose the battery as an 25 automotive power source into the rear part of the vehicle, so that the same effect as mentioned above is obtained. Moreover, a large-sized battery for supplying electric power to the electric motor is mounted at a lower part of the vehicle, separately from the battery as an automotive 5 power source.

Furthermore, in a front-engine, front-drive type vehicle, there is an example of similarly disposing the battery in the rear part of the vehicle in order to prevent the weight of the vehicle front part from 10 increasing as disclosed in Japanese Utility Model Publication No. 3058/1988.

As mentioned above, if the battery is mounted at the rear part of the vehicle, the larger space is obtained in the engine room, so that the degree of the freedom for 15 arranging the components in the engine room is increased, and also the degree of freedom for designing the whole vehicle is expanded. In addition, a maneuverability of the vehicle can be increased since the weight of the vehicle front part is prevented from increasing. 20 Furthermore, since the battery and components for mounting the same are not disposed at the front part of the vehicle, the rigidity of the vehicle front part is prevented to locally increase. Thereby, when an impact load over a predetermined value is applied from a front direction of 25 the vehicle to the vehicle itself, a proper crash stroke is obtained, so that a safety can be increased.

However, when the impact load over the predetermined value is applied from a rear direction of the vehicle, a deformation of the vehicle rear part may occur, so that 5 there is likelihood that the battery may break or an electrolyte thereof may leak from the broken battery.

SUMMARY OF THE INVENTION

Accordingly, an object of the invention which has been made in the light of the foregoing is to provide a structure for installing an automotive battery which would protect the battery installed in a rear part of a vehicle body. The present invention contains the following features which are considered improvements over the prior art.

The invention is a structure for installing an automotive battery in which the batter is mounted on a battery mounting base provided on a floor in a rear part of a vehicle body. A rear suspension cross member extends along the direction of vehicle width beneath the floor, and the battery mounting base is located within an area of the floor corresponding to the location of the rear suspension cross member in plan view.

Generally, the rear suspension cross member is essential in a rear suspension structure and is used for connecting a lateral link of the rear suspension to a vehicle body frame while sustaining mainly horizontal stress and reaction force produced from the road surface or rear suspension during driving. For example, since the rear suspension cross member supports link components which constitute the rear suspension in a front-wheel-drive vehicle, and the rear suspension cross member also retains a differential gear at the same time in a four-wheel-drive vehicle, the rear suspension cross member itself is large-sized and has an extremely high stiffness.

Thus, according to a first aspect of the invention, the area of the floor overlapping with the rear suspension cross member is reinforced by the strong rear suspension cross member and the battery mounting base is installed in the reinforced area of the floor, so that where its rigidity has been ensured, so that deformation of the area of the floor where the battery mounting base for supporting the battery is provided is prevented or significantly reduced even when the rear part of the vehicle body deforms due to an impact load of a specific value or above applied to the vehicle body from behind. As a consequence, deformation of the battery mounting base is prevented and breakage of the battery is avoided.

Furthermore, since the aforementioned area of the floor is strengthened by the existing rear suspension cross member, there is no need for additional stiffening members and it is possible to avoid weight increase and suppress an increase in production cost.

In this invention, the battery mounting base comprises a battery mounting surface on which the battery is mounted. A front surface part extends downward from a front edge of the battery mounting surface with a lower end of the front surface part connected to the floor. A rear surface part extends downward from a rear edge of the battery mounting surface with a lower end of the rear surface part connected to the floor.

According to the invention, the battery mounting base is formed of a simple structure including the battery mounting surface on which the battery is mounted, and the front surface part and the rear surface part extending downward from the front and rear edges of the battery mounting surface, respectively.

In the invention, the front surface part has a first physically weak portion formed in the front surface part.

According to the, the first physically weal portion is formed in the front surface part of the battery mounting base. Therefore, when members of the vehicle body, such as a rear skirt, come into contact with the battery due to an impact load exerted from behind the vehicle body, the first physically weak portion formed on the front surface part collapses and deforms, causing the batter to topple toward the front of the vehicle body thereby alleviating the impact on the battery as well as avoiding or significantly reducing the instances of damage to the battery.

In the invention, there is provided a second physically weak portion in an area of the battery mounting surface on the rear of its center in the longitudinal direction of the vehicle body.

According to the invention, there is provided the second physically weak portion in a rear part of the battery mounting surface in addition to the first physically weak portion. Therefore, when members of the vehicle body, such as the rear skirt, come into contact with the battery, not only the first physically weak portion but also the second physically weak portion deforms so that the rear part of the battery mounting surface is lifted upward and the battery is caused to topple frontward in a more reliable fashion thereby resulting in alleviating the impact on the battery as well as avoiding or significantly reducing the instances of damage to the battery.

In the invention, the rear surface part extends obliquely upward toward the front of the vehicle body.

According to the invention, when a turning force is exerted on the rear suspension cross member forcing its front portion upward due to an impact load applied from behind the vehicle body, the rear edge of the battery mounting surface is supported by the inclined rear surface part. The first physically weak portion collapses and deforms due to the impact. Consequently, the battery mounted on the battery mounting surface is kept from turning over rearward and held in a stable position, so that the chance of the battery breaking is prevented or reduced.

In a structure for installing an automotive battery in which the battery is mounted on a battery mounting base provided on a floor in a rear part of a vehicle body, a rear suspension cross member extends along the direction of vehicle width beneath the floor. The battery mounting base includes a battery mounting surface on which the battery is mounted. A front surface part extends downward from a front edge of the battery mounting surface and connected to the floor in its area corresponding to the location of the rear suspension cross member in plan view. A rear surface part extending downward from a rear edge of the battery mounting surface with a lower end of the rear surface part connected to the floor at the rear of the rear suspension cross member in plan view, and a first physically weak portion formed in the front surface part.

According to the invention, when a rear part of the vehicle body deforms due to an impact load applied to the vehicle body from behind, a rear part of the battery mounting surface is forced upward by the rear surface part whose lower end is connected to the floor which deforms and is pushed frontward. At the same time, the first physically weak portion formed in the front surface part deforms and the battery mounting surface inclines, causing the battery to list frontward. As a consequence, the battery is kept from coming into contact with members of the vehicle body, such as a rear skirt, or impact force due to their contact is alleviated, so that breakage of the battery is prevented or significantly reduced.

The structure comprises a mounting base plate provided on the battery mounting surface for mounting the battery. The mounting base plate provided on the battery mounting surface has a bottom surface whose width is larger than the width of the battery mounting surface measured in the longitudinal direction of the vehicle body.

It is possible to install a battery having a larger width than the width of the battery mounting surface measured in the longitudinal direction.

The structure comprises a mounting base plate provided on the battery mounting surface, the mounting base plate having a bottom portion on which the battery is mounted and a surrounding wall which extends upward from the periphery of the bottom portion and surrounds the outer periphery of the battery.

According to the invention, the battery is protected against an impact load or the like by the mounting base plate, especially by the surrounding wall. Furthermore, even when the battery is broken, dispersion of its fragments and electrolyte is avoided by the surrounding wall and the electrolyte is kept from flowing out by the box-shaped mounting base plate including an electrolyte storage.

The surrounding wall has an electrolyte storage formed by making an outward swelling on the surrounding wall.

The electrolyte is kept from flowing out more securely since the electrolyte storage is formed by making an outward swelling on the surrounding wall.

DESCRIPTION OF THE PREFERRED EMBODIMENTS

Structures for installing an automotive battery according to embodiments of the invention are described below with reference to drawings.

First Embodiment

Figure 1:
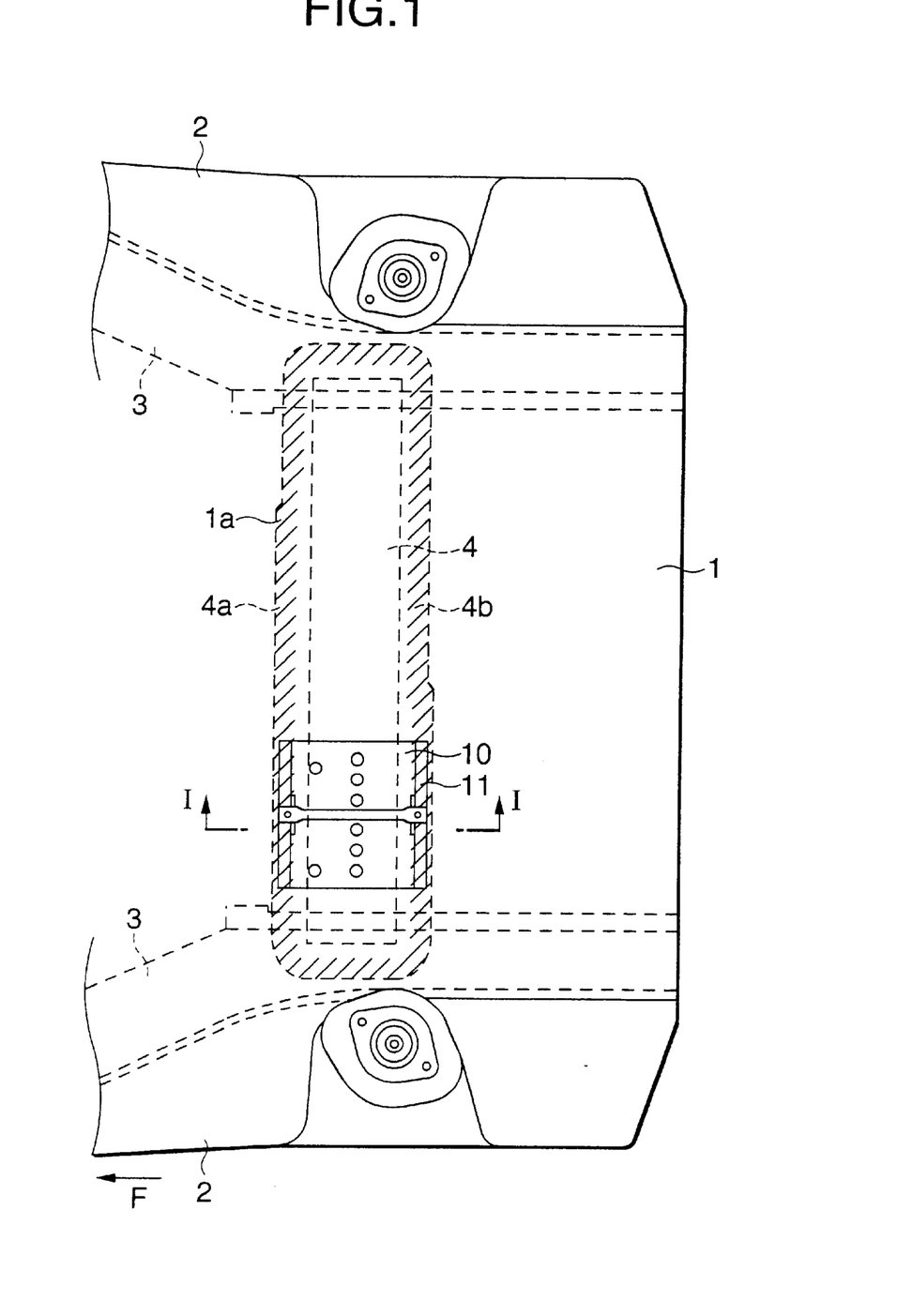
FIG. 1 is a plan view of a rear floor generally showing a first embodiment of a structure for installing an automotive battery according to the invention.
Figure 2:
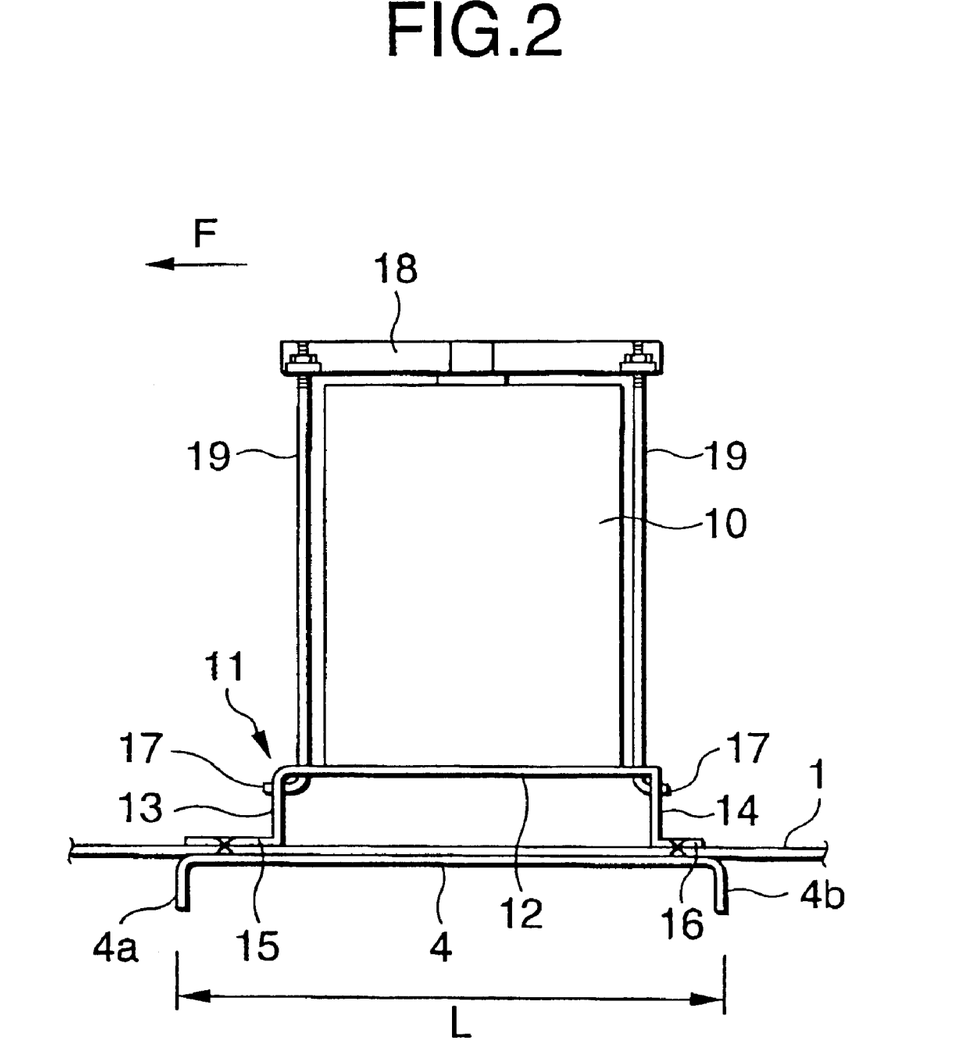
FIG. 2 is a cross-sectional view of the same taken along lines I—I of FIG. 1.
Figure 3:
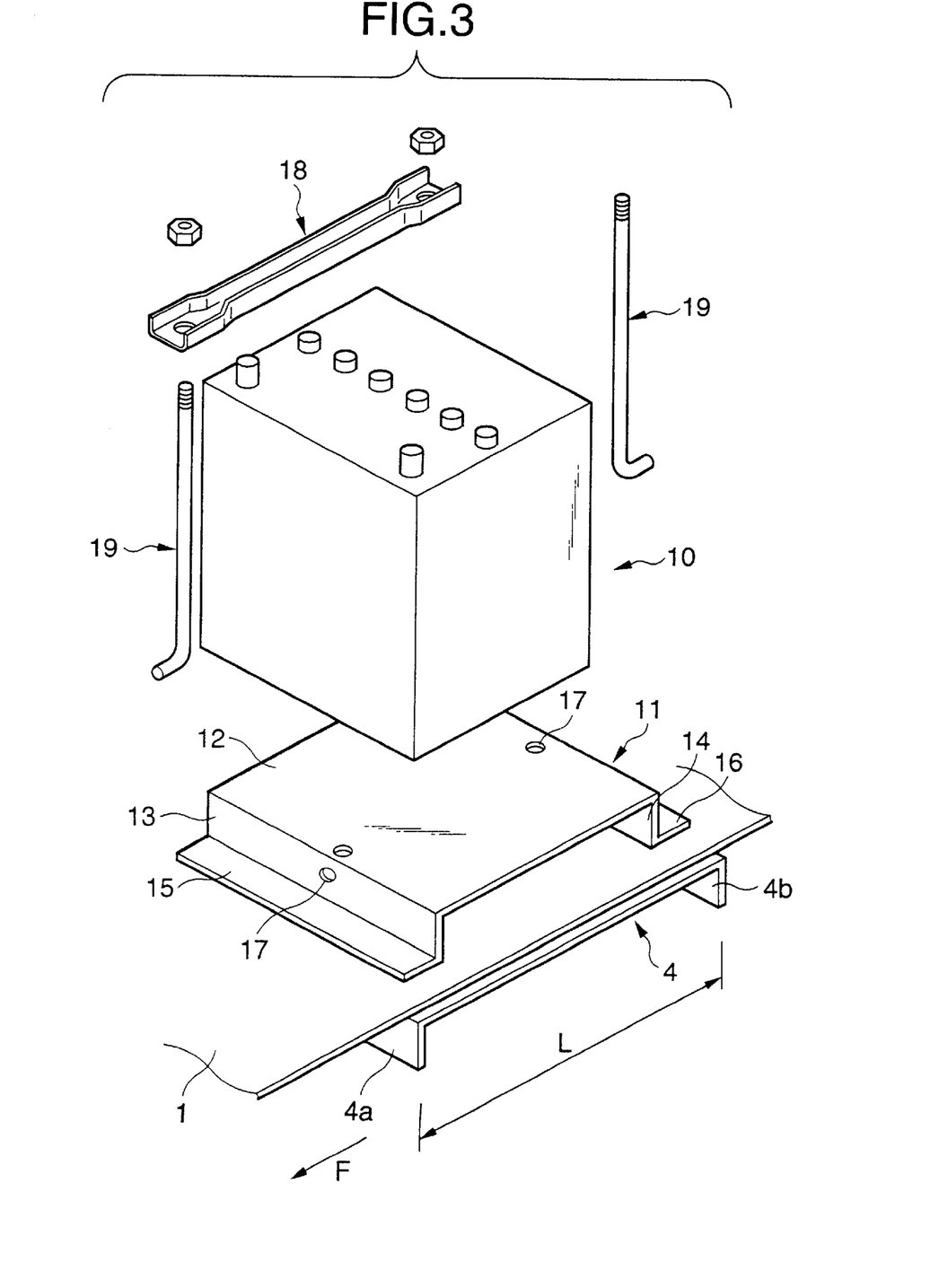
FIG. 3 is a fragmentary exploded perspective view of the same.

A first embodiment of the invention is now described referring to FIGS. 1 to 3, in which arrows F indicate a forward direction of a vehicle body.

FIG. 1 is a plan view of a floor showing this embodiment, FIG. 2 is a cross-sectional view taken along lines I—I of FIG. 1, and FIG. 3 is a partially sectional exploded perspective view.

The reference numeral 1 designates the floor. For example, wheel aprons 2 are provided in an upright position on both left and right sides of the floor 1 inside a trunk at the back of a rear seat (not shown) and left and right side members 3 are provided on the left and right sides on the lower surface of the floor 1 along a longitudinal direction.

There is provided a rear suspension cross member 4 extending in the direction of the vehicle width between the left and right wheel aprons 2, bridging both side members 3 to each other on the lower surface of the floor 1 with both ends of the rear suspension cross member 4 connected to the individual side members 3. A suspension (not shown) for supporting rear wheels in the aforementioned left and right wheel aprons 2 is attached to this rear suspension cross member 4.

The rear suspension cross member 4 is a platelike member having a generally U-shaped cross section with its front marginal portion 4a and rear marginal portion 4b bent downward. It supports the vehicle body via the suspension and has sufficient rigidity to withstand vibrations and shocks during driving.

There is provided a battery mounting base 11 for mounting a battery 10 in an area 1a (the area shown by hatching in FIG. 1) of the floor 1, the area 1a being a zone of width L in the longitudinal direction of the vehicle body corresponding to the location of the rear suspension cross member 4 in plan view.

The battery mounting base 11 has a generally hat-shaped cross section of a simple structure extending in the direction of the vehicle width having a generally flat battery mounting surface 12. The battery mounting base 11 further has a front surface part 13 and a rear surface part 14 formed and extended by bending front and rear edges of the battery mounting surface 12 downward, respectively, and a front mounting flange 15 and a rear mounting flange 16 formed by bending lower edges of the front surface part 13 and the rear surface part 14 frontward and rearward, respectively, as shown in the partially sectional exploded perspective view of FIG. 3. This battery mounting base 11 is attached onto the floor 1 by welding the front mounting flange 15 and the rear mounting flange 16 to the floor 1 on the inside of the aforementioned area 1a.

Further, fixing holes 17 are made in the battery mounting surface 12 of the battery mounting base 11 close to its front edge and in the front surface part 13 at a corresponding position close to its upper edge, with additional fixing holes 17 made in the battery mounting surface 12 close to its rear edge and in the rear surface part 14 at a corresponding position close to its upper edge.

A battery holder 18 is placed on top of the battery 10 which has been placed on the battery mounting surface 12 of the battery mounting base 11, and the battery 10 is fixed to the top of the battery mounting base 11 as both ends of the battery holder 18 are secured by fitting nuts onto fixing bolts 19 whose lower ends are fitted into the aforementioned fixing holes 17.

According to this embodiment thus configured, the area of the floor 1 overlapping with the rear suspension cross member 4, or the area 1a, is reinforced by the strong rear suspension cross member 4 and, since the battery mounting base 11 is installed within the area of the floor where its rigidity has been ensured and the battery 10 is mounted on the battery mounting base 11, the area 1a of the floor 1 where the battery 10 is installed becomes an undeformed remaining space whose deformation is prevented or significantly reduced even when a rear part of the vehicle body deforms due to an impact load of a specific value or above applied to the vehicle body from behind. This serves to prevent breakage of the battery mounting base 11 and the battery 10 mounted on the battery mounting base 11 as well as leakage of an electrolyte and ensure safety.

Since the aforementioned area 1a of the floor 1 is reinforced by the existing rear suspension cross member 4, there is no need for additional stiffening members or only a very few stiffening members are required. Therefore, it is possible to avoid weight increase and to use an existing vehicle body, so that an increase in production cost can be avoided coupling possibility to use existing body.

Second Embodiment

Figure 4:
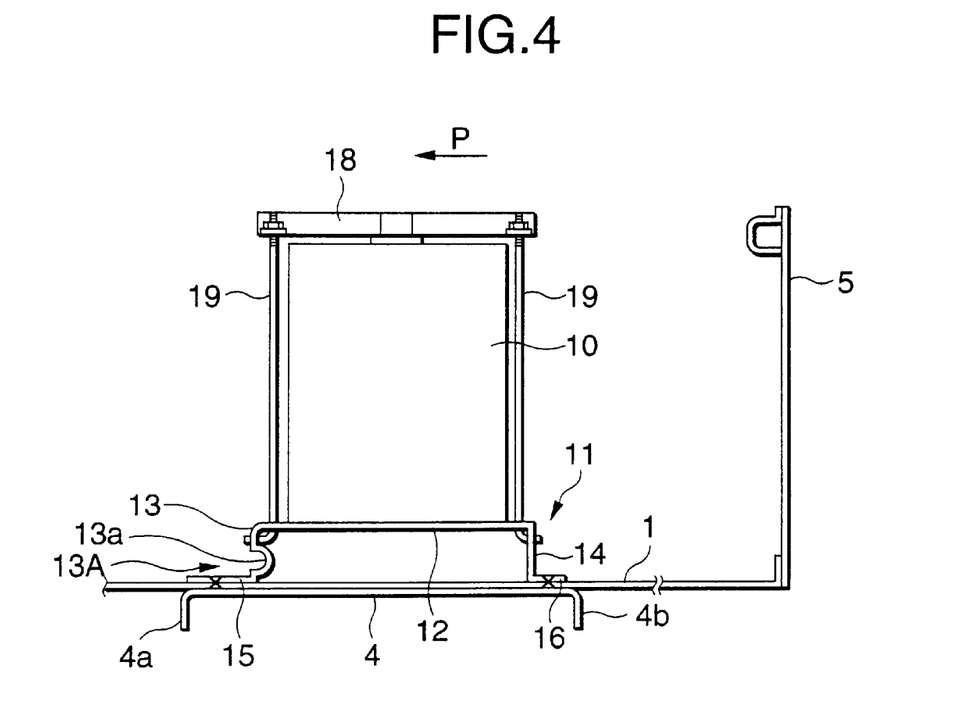
FIG. 4 is a fragmentary cross-sectional view generally showing a second embodiment of a structure for installing an automotive battery according to the invention.

A second embodiment of the invention is described referring to a cross-sectional view shown in FIG. 4 which corresponds to FIG. 2 shown above, and to FIG. 5 showing a fragmentary perspective view. For the convenience of explanation, portions corresponding to those of FIGS. 1 to 3 shown above are designated by the same reference numerals and their description is omitted. Accordingly, the following discussion deals mainly with different portions.

Figure 5:
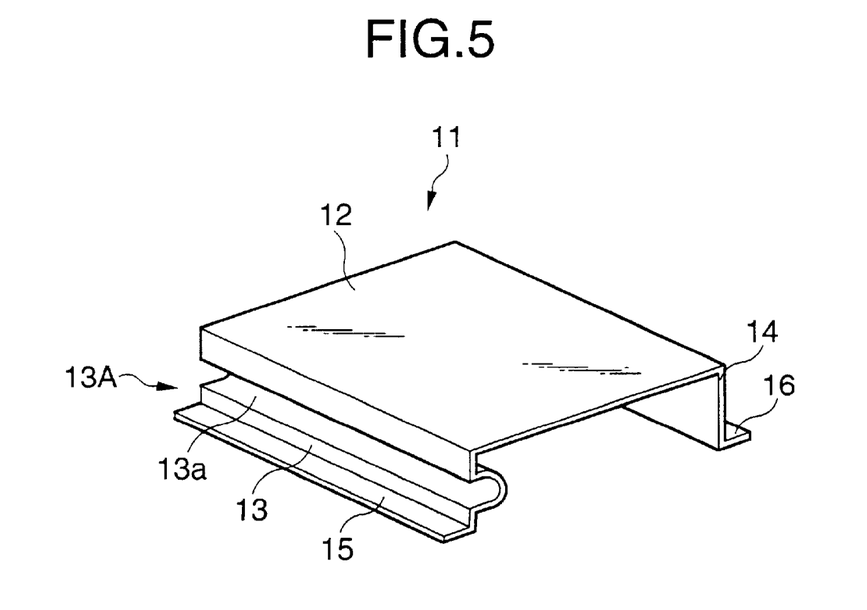
FIG. 5 is a fragmentary perspective view of the same.

This embodiment has a characteristic that a battery mounting base 11 is provided with a first physically weak portion 13A which enables a battery 10 to easily topple frontward when a load P of a specific value or above applied to on the battery 10 from behind.

This first physically weak portion 13A is made by forming a bead 13a having a generally U-shaped cross section extending in the direction of the vehicle width in a front surface part 13 of the battery mounting base 11 which has a generally hat-shaped cross section as shown in FIGS. 4 and 5, for example, or by making a slit or a plurality of holes in the front surface part 13.

According to this embodiment thus configured, deformation of the area 1a of the floor 1 where the battery 10 is installed is prevented or significantly reduced by a rear suspension cross member 4 even when a rear part of the vehicle body deforms due to an impact load of a specific value or above applied to the vehicle body from behind as in the case of the foregoing first embodiment. Also, when members of the vehicle body, such as a rear skirt 5 which is raised in an upright position at a rear edge of the floor 1 and separates the vehicle interior from the exterior, are pushed frontward and come into contact with the battery 10, the first physically weak portion 13A made of the bead 13a, the slit or the multiple holes formed in the front surface part 13 of the battery mounting base 11 is caused to collapse and deform, eventually causing the battery 10 to topple frontward. As a consequence, impact force exerted by the rear skirt 5, for instance, is alleviated so that breakage of the battery 10 is avoided or significantly reduced.

It is also possible to make a physically weak portion by forming a bead having a generally U-shaped cross section extending in the direction of the vehicle width in a rear surface part 14 of the battery mounting base 11 or by making a slit or a plurality of holes in the rear surface part 14 instead of, or in addition to, the aforementioned first physically weak portion 13A, so that the physically weak portion formed in the rear surface part 14 of the battery mounting base 11 deforms by stretching, causing the battery 10 to topple frontward, when members of the vehicle body, such as the rear skirt 5, are pushed frontward and come into contact with the battery 10. This would help alleviate impact force so that breakage of the battery 10 is avoided or reduced.

Third Embodiment

Figure 6:
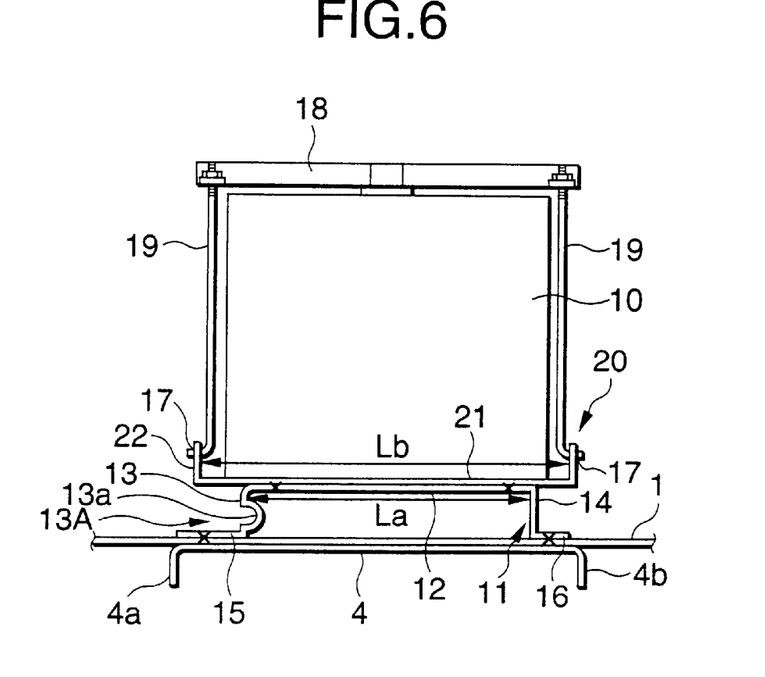
FIG. 6 is a fragmentary cross-sectional view generally showing a third embodiment of a structure for installing an automotive battery according to the invention.

A third embodiment of the invention is described referring to a cross-sectional view shown in FIG. 6 which corresponds to FIG. 4 shown above. For the convenience of explanation, portions corresponding to those of FIG. 4 shown above are designated by the same reference numerals and their description is omitted. Accordingly, the following discussion deals mainly with different portions.

This embodiment has a characteristic that a mounting base plate 20 is attached to the top of a battery mounting surface 12 of a battery mounting base 11, the mounting base plate 20 having a width Lb which is equal to or greater than the width La of the battery mounting surface 12 in its longitudinal direction.

The mounting base plate 20 has a rectangular bottom portion 21 which is attached to the top of the battery mounting surface 12 of the battery mounting base 11 and on which a battery 10 is mounted, and a surrounding wall 22 formed by bending the mounting base plate 20 upward from the periphery of the bottom portion 21. Fixing holes 17 are made in front and rear sides of the surrounding wall 22 that face each other. A battery holder 18 is placed on top of the battery 10 which has been placed on the mounting base plate 20 and the battery 10 is fixed to the top of the battery mounting base 11 with the mounting base plate 20 placed between them by fitting nuts onto fixing bolts 19 which have been fitted into the fixing holes 17.

According to this embodiment thus configured, it becomes possible to install the battery 10 having a larger size than the battery mounting surface 12 by providing the mounting base plate 20 having the width Lb which is greater than the width La of the battery mounting surface 12 on top of the battery mounting surface 12 of the battery mounting base 11.

Since the battery mounting base 11 is fixed within an area of the floor 1 reinforced by a rear suspension cross member 4 in this embodiment as in the case of the foregoing first embodiment, the area of the floor 1 where the battery mounting base 11 is provided becomes a remaining space whose deformation is prevented or significantly reduced even when a rear part of the vehicle body deforms due to an impact load applied to the vehicle body from behind. This serves to prevent breakage of the battery mounting base 11 and the battery 10, for instance.

Also when members of the vehicle body, such as the rear skirt 5 which is raised in an upright position at the rear edge of the floor 1, are pushed frontward and come into contact with the battery 10, a first physically weak portion 13A formed in a front surface part 13 of the battery mounting base 11 enables the battery 10 to easily topple frontward, thereby alleviating impact force and preventing breakage of the battery 10.

Fourth Embodiment

Figure 7:
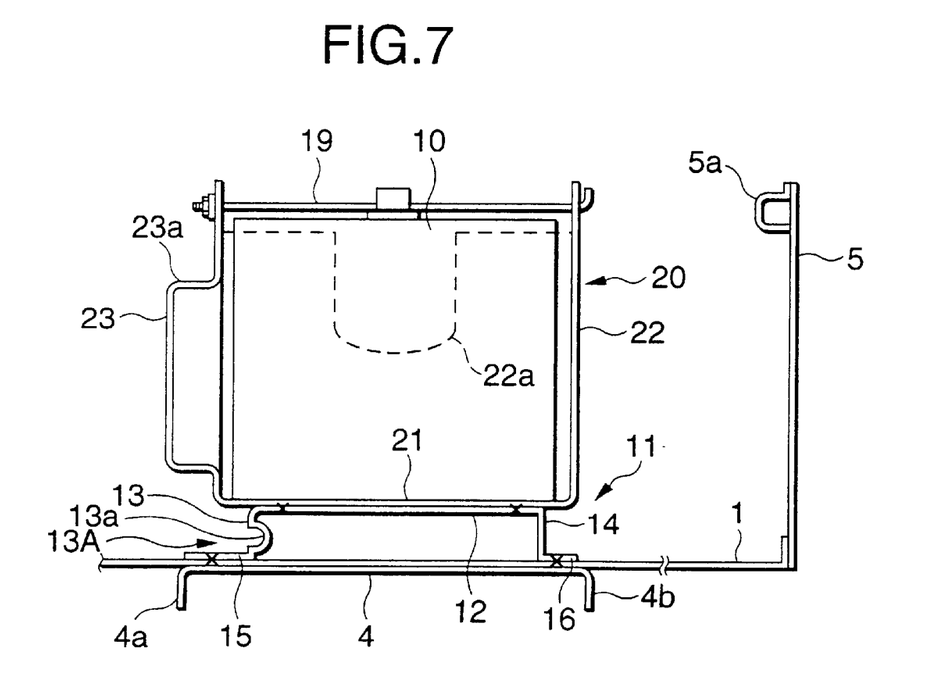
FIG. 7 is a fragmentary cross-sectional view generally showing a fourth embodiment of a structure for installing an automotive battery according to the invention.

A fourth embodiment of the invention is described referring to a cross-sectional view shown in FIG. 7. FIG. 7 is the cross-sectional view generally corresponding to FIG. 6 shown above. Portions corresponding to those of FIG. 6 shown above are designated by the same reference numerals and their description is omitted. Accordingly, the following discussion deals mainly with different portions.

This embodiment has a characteristic that a surrounding wall 22 of a mounting base plate 20 provided on top of a battery mounting surface 12 of a battery mounting base 11 extends up to a height which reaches an upper end of a battery 10 installed and an electrolyte storage 23 is formed by making an outward swelling on the surrounding wall 22.

This mounting base plate 20 can accommodate the battery 10 and its surrounding wall 22 surrounds the outer periphery of the battery 10 installed. The mounting base plate 20 has a box-like structure reaching the proximity of the upper end of the battery 10. There are formed cutouts 22a in left and right sides of its surrounding wall 22, or in lateral directions of the vehicle, for facilitating installation or removal of the battery 10, and the electrolyte storage 23 is formed by making the outward swelling on the surrounding wall 22.

In a case where the electrolyte storage 23 formed on a surface of the surrounding wall 22 facing the rear skirt 5, it is preferable to prevent or reduce interference between the rear skirt 5 and the electrolyte storage 23 which may occur when the rear skirt 5 is pushed toward the vehicle interior due to an impact load from the rear of the vehicle body. This would be achieved by positioning an upper end 23a of the electrolyte storage 23 lower than a so-called rear skirt sectional part 5a which is formed in a closed sectional shape projecting toward the vehicle interior at an upper end of the rear skirt 5, in order to prevent overlapping of the electrolyte storage 23 formed as the outward swelling with the rear skirt sectional part 5a in the direction of its height.

According to this embodiment thus configured, the battery 10 is protected against the impact load or the like by the mounting base plate 20, besides the advantageous effects of the third embodiment. Furthermore, even when the battery 10 is broken, dispersion of its fragments and electrolyte is avoided and the electrolyte is kept from flowing out by the box-shaped mounting base plate 20 including the electrolyte storage 23.

Fifth Embodiment

Figure 8:
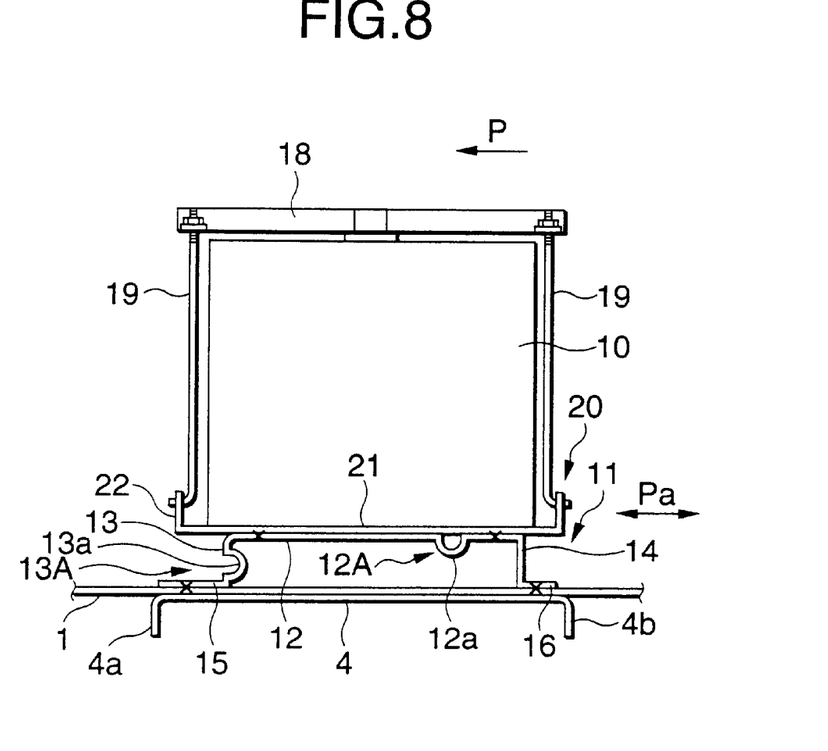
FIG. 8 is a fragmentary cross-sectional view generally showing a fifth embodiment of a structure for installing an automotive battery according to the invention.
Figure 9:
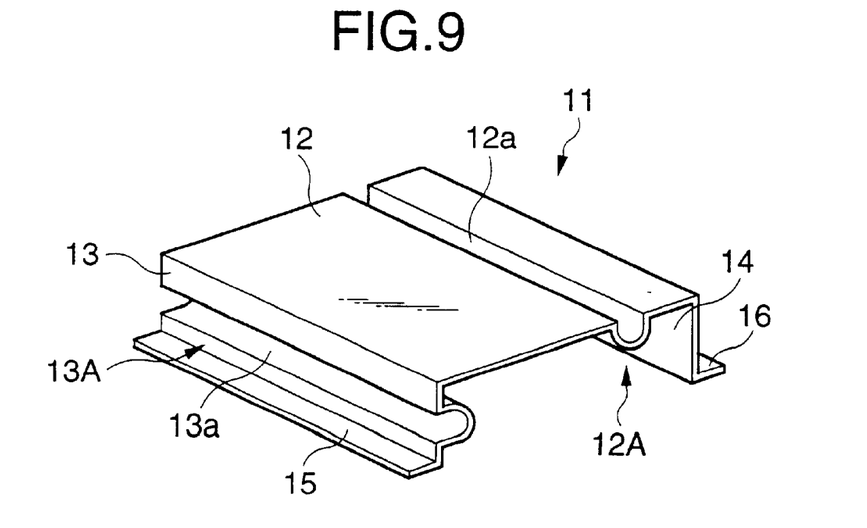
FIG. 9 is a perspective view of a battery mounting base of the same.
Figure 10:
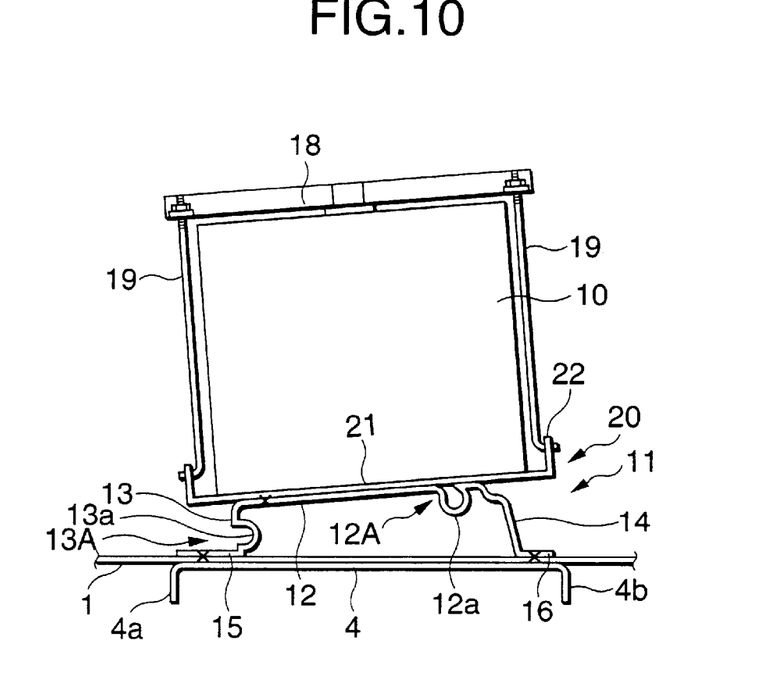
FIG. 10 is a diagram for explaining an operation in accordance with the fifth embodiment.

A fifth embodiment of the invention is described referring to FIGS. 8 to 10. FIG. 8 is a cross-sectional view generally corresponding to FIG. 6, FIG. 9 is a perspective view of a battery mounting base 11, and FIG. 10 is a diagram for explaining its operation. Portions corresponding to those of FIG. 6 shown above are designated by the same reference numerals and their description is omitted. Accordingly, the following discussion deals mainly with different portions.

This embodiment has a characteristic that the battery mounting base 11 is provided with a first physically weak portion 13A and a second physically weak portion 12A which causes a battery 10 to topple frontward when a load P of a specific value or above acts on the battery 10 from behind and a load Pa acts on the battery mounting base 11 in its front-to-back direction.

As shown in the perspective view of a battery mouting base 11 in FIG. 9, the first physically weak portion 13A is made by forming a U-shaped bead 13a extending in the direction of the vehicle width in a front surface part 13 of the battery mounting base 11 or by making a slit or a plurality of holes in the front surface part 13 as in the case of the aforementioned third embodiment.

On the other hand, the second physically weak portion 12A is formed of a bead 12a having a generally U-shaped cross section, for instance, extending in the direction of the vehicle width across a battery mounting surface 12 in its area on the rear of its longitudinal center.

According to this embodiment thus configured, deformation of an area of the floor 1 where the battery mounting base 11 is provided is reduced by a rear suspension cross member 4 and breakage of the battery mounting base 11 and the battery 10, for instance, is avoided even when a rear part of the vehicle body deforms due to an impact load applied to the vehicle body from behind as in the case of the foregoing third embodiment. Also when members of the vehicle body, such as a rear skirt, come into contact with the battery 10, the first physically weak portion 13A formed in the front surface part 13 of the battery mounting base 11 deforms, causing the battery 10 to topple frontward. As a consequence, impact force exerted on the battery 10 is alleviated.

Furthermore, as the battery 10 topples frontward as described above, the load Pa acts on the battery mounting surface 12 of the battery mounting base 11 in its longitudinal direction and in a direction of lifting the rear part of the battery mounting surface 12 upward via a mounting base plate 20. As a result, the bead 12a formed in the battery mounting surface 12 is bent, as if collapsing, rise the back portion of battery mounting surface 12 as shown in FIG. 10 and the battery 10 is caused to topple in a more reliable fashion, whereby the impact force exerted on the battery 10 is more alleviated and breakage of the battery 10 is prevented more positively.

It is also possible in this embodiment to extend a surrounding wall 22 of the mounting base plate 20 up to the proximity of the upper end of the battery 10 installed, and form an electrolyte storage 23 by making an outward swelling on the surrounding wall 22 to protect the battery 10 from an impact load as in the case of the fourth embodiment.

Sixth Embodiment

Figure 11:
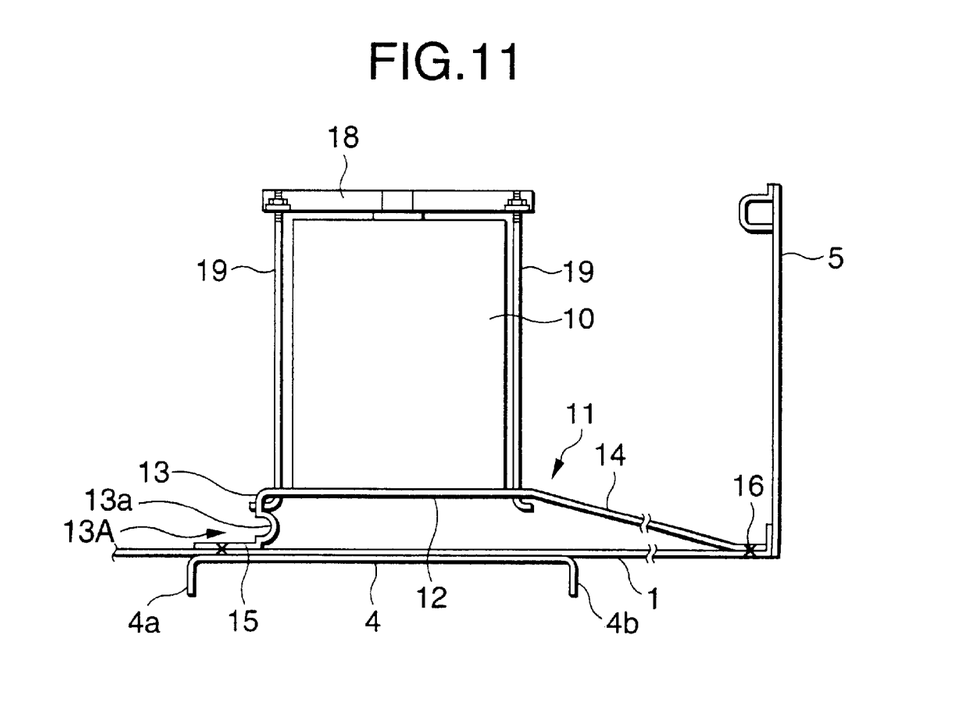
FIG. 11 is a fragmentary cross-sectional view generally showing a sixth embodiment of a structure for installing an automotive battery according to the invention.
Figure 12:
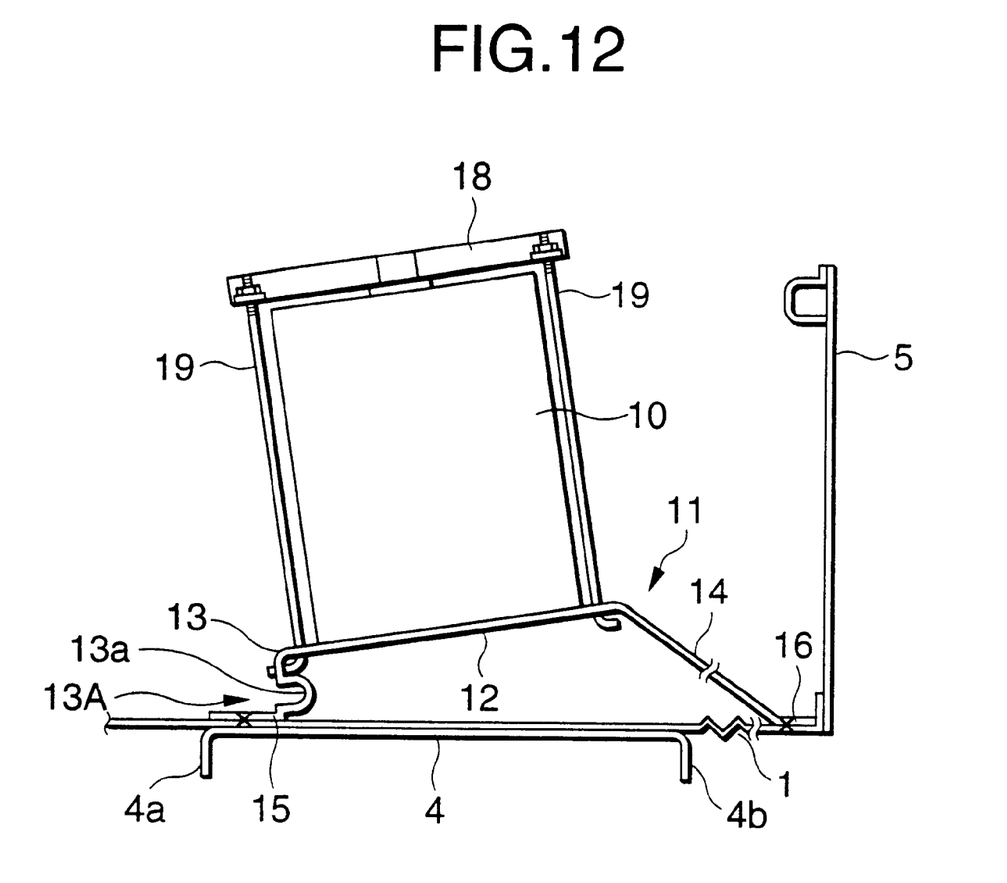
FIG. 12 is a diagram for explaining an operation in accordance with the sixth embodiment.

A sixth embodiment of the invention is described referring to FIGS. 11 and 12. FIG. 11 is a cross-sectional view generally corresponding to FIG. 4, and FIG. 12 is a diagram for explaining operation. In FIGS. 11 and 12, portions corresponding to those of FIG. 4 are designated by the same reference numerals and their description is omitted. Accordingly, the following discussion deals mainly with different portions.

This embodiment has a characteristic that a battery mounting surface 12 of a battery mounting base 11 is caused to incline so that a battery 10 lists frontward as a result of deformation of a rear part of the vehicle body as it is pushed frontward due to an impact load applied to the vehicle body from behind.

There is formed a first physically weak portion 13A in the battery mounting base 11 of this embodiment by making a U-shaped bead 13a extending in the direction of the vehicle width in a front surface part 13 formed by bending the battery mounting base 11 downward from a front edge of the battery mounting surface 12 as shown in FIG. 11, or by making a slit or a plurality of holes in the front surface part 13. A lower end of the battery mounting base 11 is connected to an area of the floor 1 overlapping with the rear suspension cross member 4 by a front mounting flange 15.

On the other hand, a rear surface part 14 formed by bending the battery mounting base 11 at a rear edge of the battery mounting surface 12 extends obliquely downward toward the rear and its lower end is connected to the floor 1 between the rear marginal portion 4b of the rear suspension cross member 4 and a bottom end of a rear skirt 5, or in the vicinity of the bottom end of the rear skirt 5, for example.

According to this embodiment thus configured, when a rear part of the vehicle body deforms due to an impact load applied from behind, a rear part of the battery mounting surface 12 is pushed upward by the rear surface part 14 whose lower end is connected to a rear portion of the floor 1 which is forced frontward as a result of the deformation. Also, the first physically weak portion 13A formed in the front surface part 13 deforms and the battery mounting surface 12 inclines as shown in FIG. 12, causing the battery 10 to list frontward. As a consequence, the battery 10 is kept from going into contact with members of the vehicle body, such as a rear skirt 5, or impact force due to their contact is alleviated, so that breakage of the battery 10 is prevented.

It is also possible in this embodiment to provide a mounting base plate 20, extend its surrounding wall 22 up to the proximity of the upper end of the battery 10 installed, and form an electrolyte storage 23 by making an outward swelling on the surrounding wall 22 to protect the battery 10 from an impact load as in the case of the fourth embodiment.

Seventh Embodiment

Figure 13:
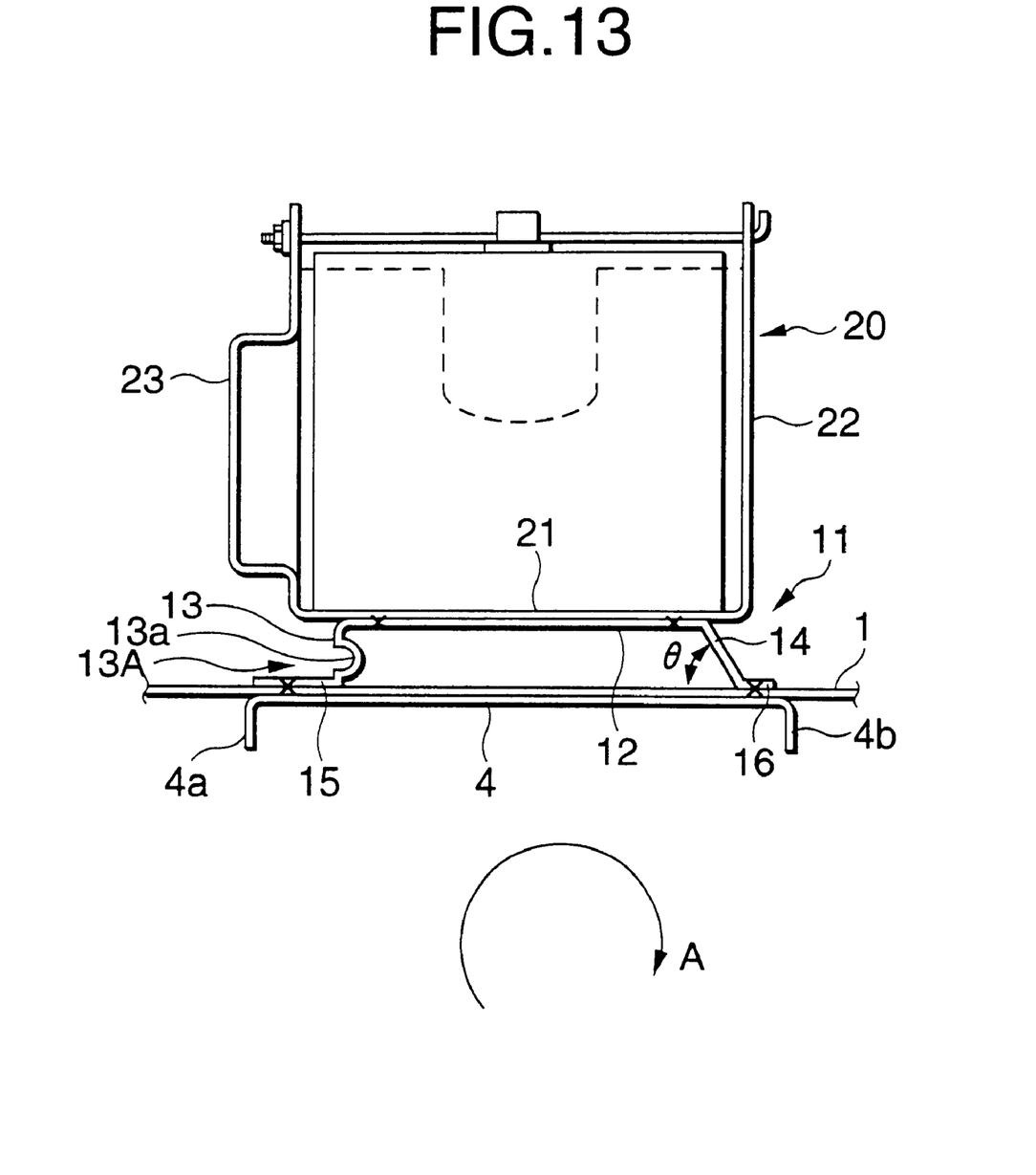
FIG. 13 is a fragmentary cross-sectional view generally showing a seventh embodiment of a structure for installing an automotive battery according to the invention.
Figure 14:
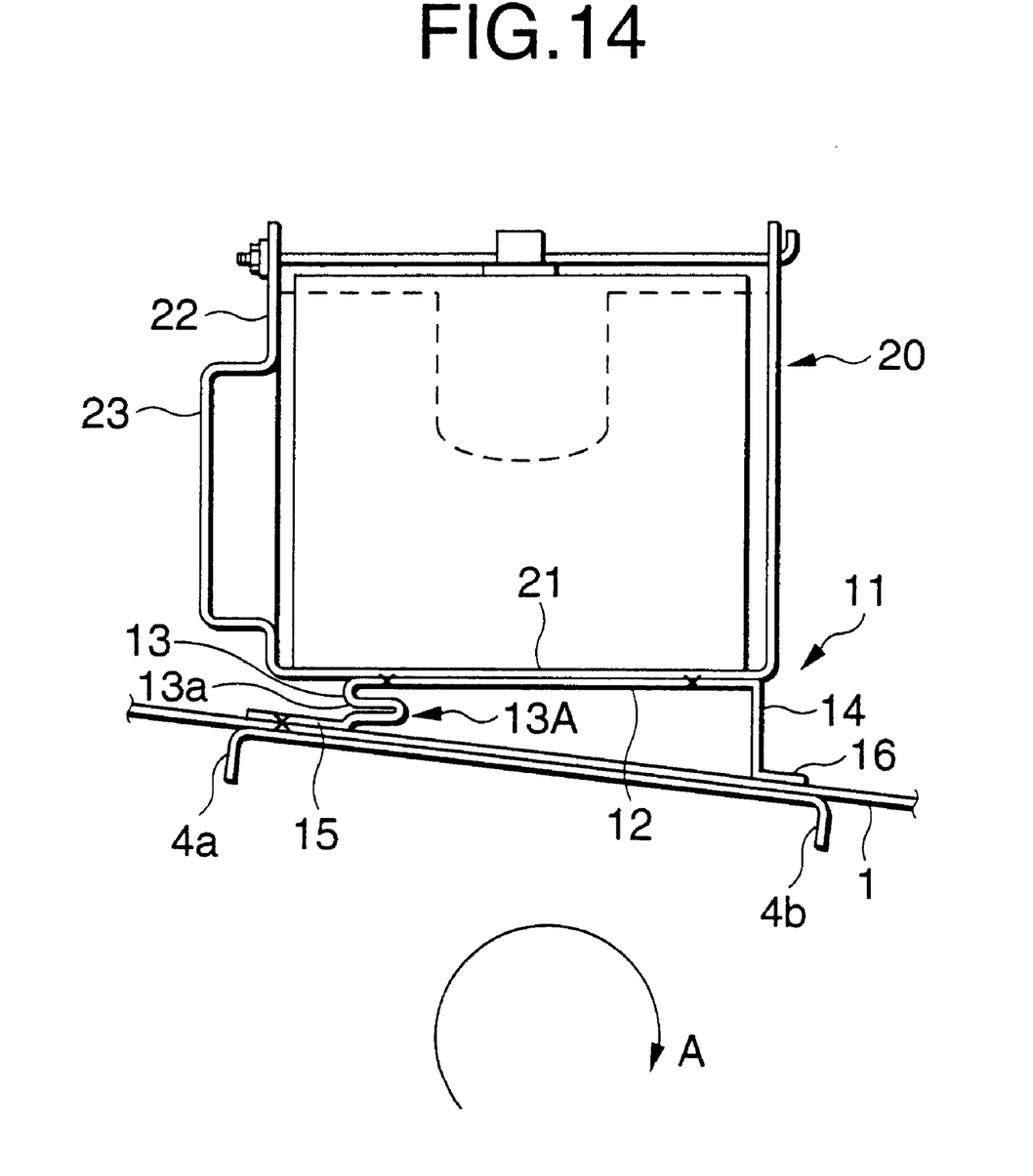
FIG. 14 is a diagram for explaining an operation in accordance with the seventh embodiment.

A seventh embodiment of the invention is described referring to a cross-sectional view shown in FIG. 13 and an operational diagram shown in FIG. 14. FIG. 13 is the cross-sectional view generally corresponding to FIG. 7, wherein portions corresponding to those of FIG. 7 are designated by the same reference numerals and their description is omitted. Accordingly, the following discussion deals mainly with different portions.

This embodiment has a characteristic that it keeps a battery 10 from leaning rearward and holds it in a stable position when an impact load of a specific value or above applied to the vehicle body from behind causes a rear suspension cross member 4 to ascend its side of front marginal portion 4a and descend its rear marginal portion 4b.

A battery mounting base 11 has a first physically weak portion 13A made by forming a bead 13a having a generally U-shaped cross section extending in the direction of the vehicle width in a front surface part 13 which is formed by bending the battery mounting base 11 downward from a front edge of its battery mounting surface 12, or by making a slit or a plurality of holes in the front surface part 13. A front mounting flange 15 formed at a lower end of the front surface part 13 is connected together with the floor 1 or directly to a front part, e.g., the front marginal portion 4a, of the rear suspension cross member 4.

On the other hand, a rear surface part 14 extends obliquely upward toward the front. Specifically, angle θ that the rear surface part 14 makes with the floor 1 at the front of the rear surface part 14 forms an acute angle.

According to this embodiment thus configured, when a rear part of the vehicle body deforms due to an impact load applied from behind, a turning force is exerted on the rear suspension cross member 4 forcing its side of the front marginal portion 4a upward and its side of the rear marginal portion 4b downward as shown by an arrow A since rear wheels are thrust frontward, for instance. When the lower end of the front surface part 13 is forced upward via the front mounting flange 15 as a result of this rotational motion of the rear suspension cross member 4, the bead 13a constituting the first physically weak portion 13A collapses and deforms due to a resultant impact as shown in FIG. 14 and thereby absorbs the impact, with a rear edge of the battery mounting surface 12 supported by the inclined rear surface part 14. Consequently, the battery 10 mounted on the battery mounting surface 12 is kept from turning over rearward and held in a stable position, so that breakage of the battery 10 is prevented.

The invention is not limited to the foregoing individual embodiments but may be modified in various ways without departing from the spirit and scope of the invention. For example, while the rear suspension cross member 4 is provided on the bottom of the floor 1 in the foregoing individual embodiments, deformation of the rear suspension cross member 4 and a corresponding part of the floor 1 is avoided when the rear suspension cross member 4 is located below the floor 1 with a gap provided between the floor 1 and the rear suspension cross member 4 as well, and advantageous effects of the foregoing individual embodiments are achieved if the aforementioned battery mounting base 11 is located in an area of the floor 1 overlapping with the rear suspension cross member 4 in plan view. Furthermore, although the aforementioned rear suspension cross member 4 is made of a platelike member, the invention is also applicable to a rear suspension cross member constructed of a plurality of elements which are joined together into a single structure, such as multiple cross members and a connecting bracket joining the cross members.

According to the structures for installing an automotive battery of the invention, an area of a floor overlapping with a rear suspension cross member is reinforced by the strong rear suspension cross member and a battery mounting base or part of the battery mounting base is attached to the area of the floor where its rigidity has been ensured. Therefore, even when a rear part of a vehicle body deforms due to an impact load of a specific value or above applied to the vehicle body from behind, deformation of the area of the floor where the battery mounting base for supporting the battery is provided is prevented or significantly reduced. As a consequence, deformation of the battery mounting base is prevented, the battery is protected and its breakage is avoided, and all this helps to ensure safety.

While the presently preferred embodiments of the present invention have been shown and described, it is to be understood that the disclosure is for the purpose of illustration and that various changes and modifications may be made without departing from the scope of the invention as set forth in the appended claims.

What is claimed is:

1. A structure for installing an automotive battery in which the battery is mounted on a battery mounting base provided on a floor in a rear part of a vehicle body, wherein:
    a rear suspension cross member extends along the direction of vehicle width beneath the floor; and wherein, the battery mounting base includes;
        a battery mounting surface on which the battery is mounted;
        a front surface part extending downward from a front edge of the battery mounting surface and connected to the floor in within one area of the floor corresponding to the location of the rear suspension cross member in plan view;
        a rear surface part extending downward from a rear edge of the battery mounting surface toward a lower end of the rear surface part connected to the floor at a rear side of the rear suspension cross member in plan view; and
        a first physically weak portion formed in the front surface part.

2. The structure for installing an automotive battery as recited in claim 1, wherein the structure comprises a mounting base plate provided on the battery mounting surface for mounting the battery, and the mounting base plate provided on the battery mounting surface has a bottom surface whose width in a longitudinal direction of the vehicle body is larger than the width of the battery mounting surface measured in the longitudinal direction of the vehicle body.

3. The structure for installing the automotive battery as recited in claim 1, wherein the structure comprises a mounting base plate provided on the battery mounting surface, and the mounting base plate having a bottom portion on which the battery is mounted and a surrounding wall which extends upward from the periphery of the bottom portion and surrounds the outer periphery of the battery.

4. The structure for installing the automotive battery as recited in claim 3, wherein the surrounding wall has an electrolyte storage formed by outwardly protruding one part of the surrounding wall.

* * * * *